Figure 1:
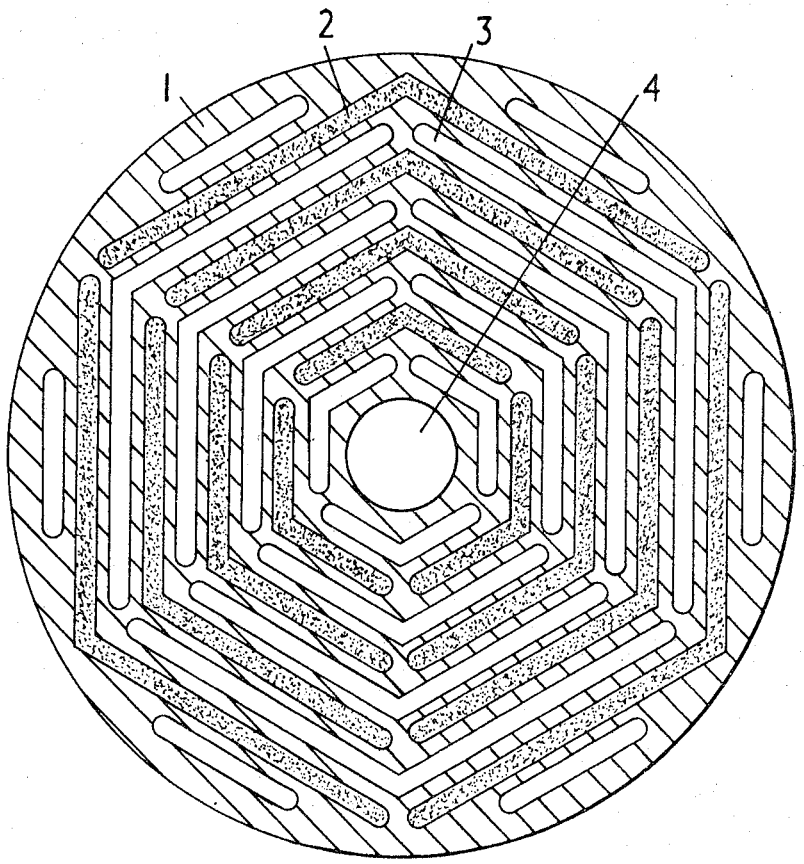
Figure 2:
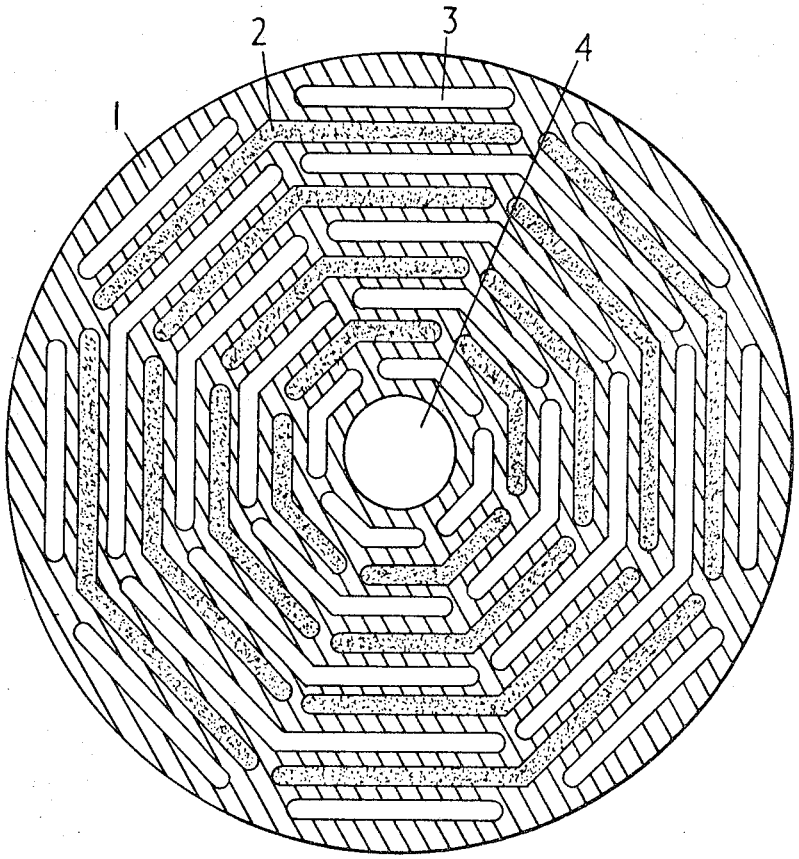
Figure 3:
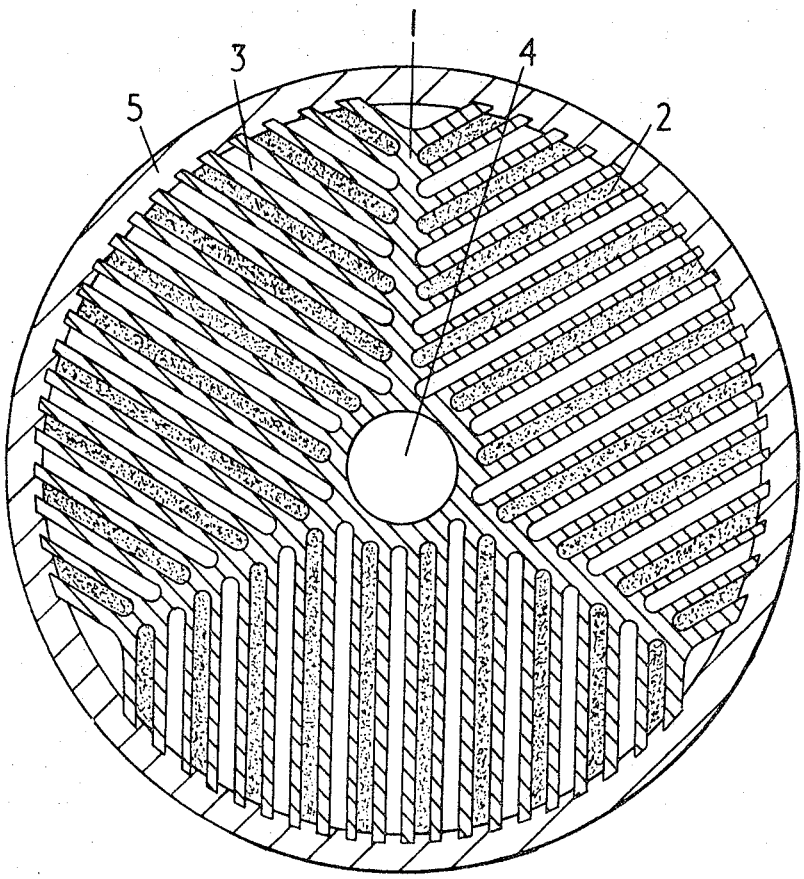
Figure 4:
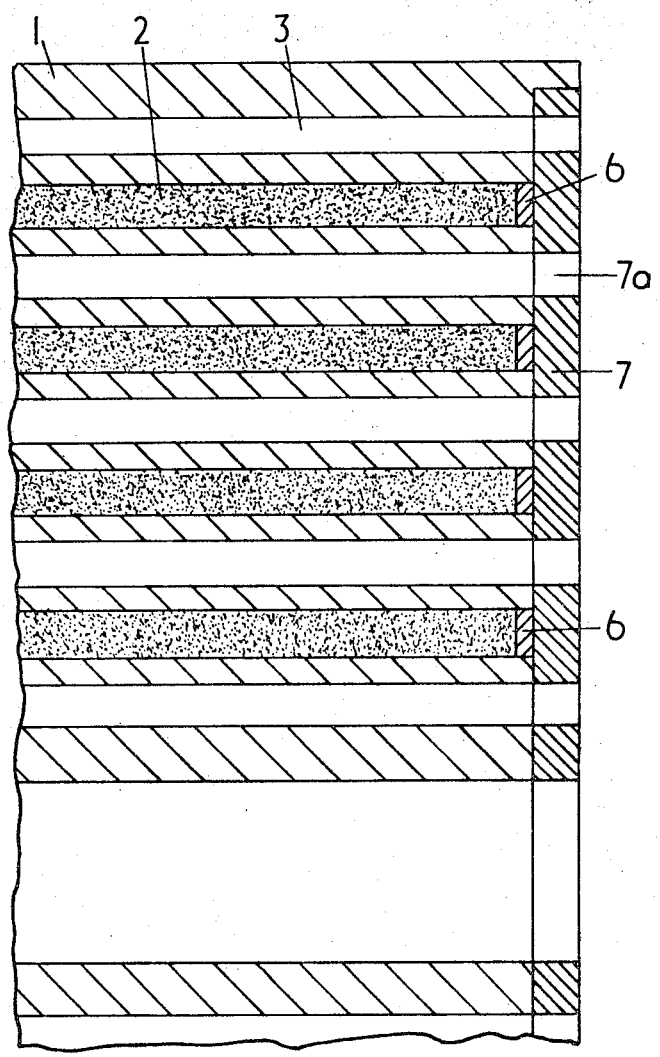
Figure 5:
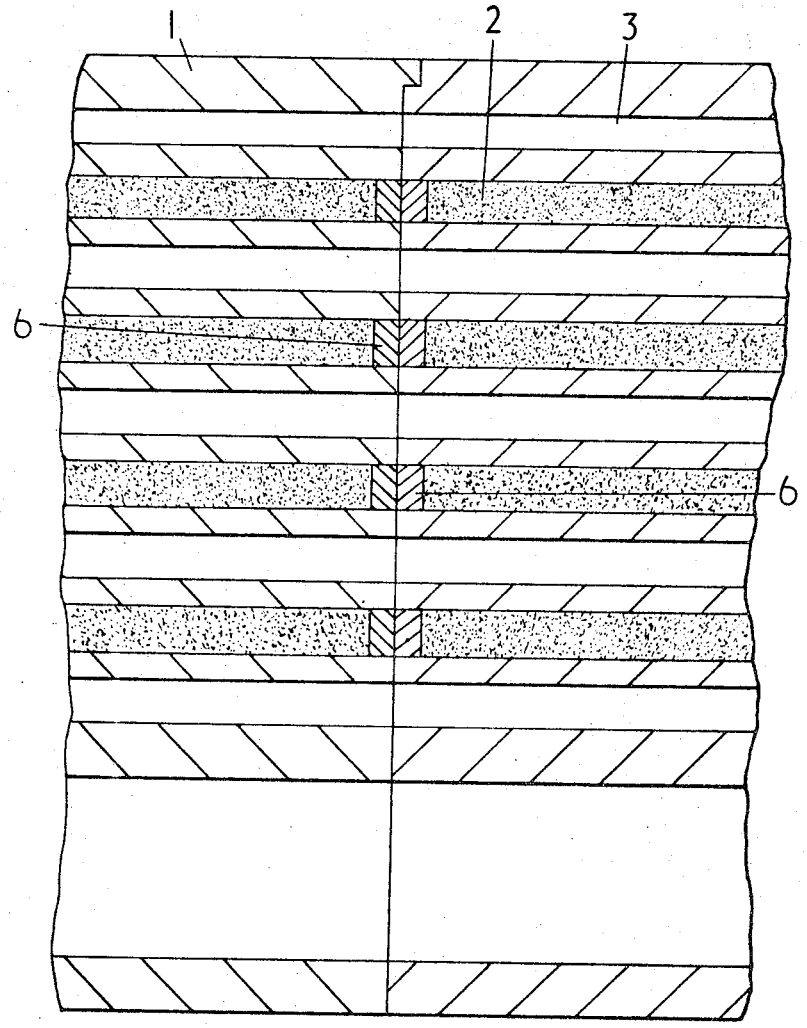

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 2, 1971

883 O.G. 8

T883,001
CORE STRUCTURES FOR NUCLEAR REACTORS
Donald Stanley Pettinger, Radbroke Hall, Knutsford, England
Filed Feb. 19, 1969, Ser. No. 800,680
Int. Cl. G21c *5/00*
U.S. Cl. 176—84
5 Sheets Drawing. 4 Pages Specification

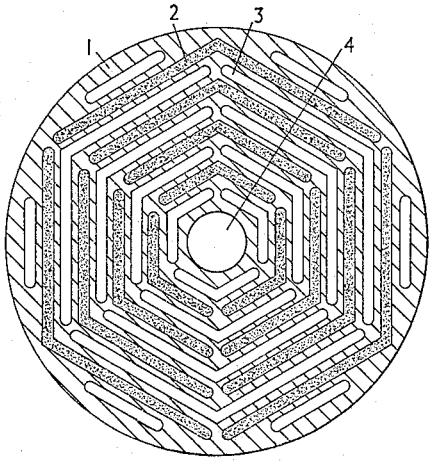

A graphite block for use in a nuclear reactor, wherein passages are formed in the block for the passage of cooling fluid, or for containing nuclear fuel, or for both purposes, at least some of the sides of each passage being flat or straight to define passages of triangular, rectangular or polygonal cross-section. The passages may be formed by using mortise chain cutting gear.

Feb. 2, 1971 D. S. PETTINGER T883,001

CORE STRUCTURES FOR NUCLEAR REACTORS

Filed Feb. 19, 1969 5 Sheets-Sheet 1

INVENTOR
DONALD STANLEY PETTINGER
BY Holman, Glascock, Downing & Seebold
ATTORNEYS

CORE STRUCTURES FOR NUCLEAR REACTORS

Filed Feb. 19, 1969 5 Sheets-Sheet 2

INVENTOR
DONALD STANLEY PETTINGER
BY Holman, Glascock, Downing & Seebold,
ATTORNEYS

CORE STRUCTURES FOR NUCLEAR REACTORS

Filed Feb. 19, 1969 5 Sheets-Sheet 3

INVENTOR
DONALD STANLEY PETTINGER
BY Holman & Glascock
Downing & Sebald
ATTORNEYS

CORE STRUCTURES FOR NUCLEAR REACTORS

Filed Feb. 19, 1969 5 Sheets-Sheet 4

INVENTOR
DONALD STANLEY PETTINGER
BY Holman, Glascock, Downing & Seebold,
ATTORNEYS

CORE STRUCTURES FOR NUCLEAR REACTORS

Filed Feb. 19, 1969 5 Sheets-Sheet 5

INVENTOR
DONALD STANLEY PETTINGER
BY Holman, Glascock, Downing & Seebold,
ATTORNEYS